United States Patent Office 3,417,018
Patented Dec. 17, 1968

3,417,018
METHOD OF THICKENING LIQUIDS AND THE PRODUCTS THEREOF
Allan F. Burns, Whitehouse Station, N.J., assignor to Johns-Manville Corporation, New York, N.Y., a corporation of New York
No Drawing. Filed Dec. 18, 1963, Ser. No. 331,393
6 Claims. (Cl. 252—13)

This invention relates to a novel and unique viscosity control agent and method of employing same, and more particularly to the new use of a mineral material as a thickening and gelling agent.

Previous methods or techniques of thickening liquids or of producing viscid, relatively immobile or congealed liquid typically comprise the use of organic thickening or gelling means as exemplified by gums, starches, proteins, cellulose derivatives such as carboxymethylcellulose, etc. which modify fluid properties by regulating or increasing the surface or interfacial tension forces of a liquid phase. Other common techniques comprise simply the introduction of agents which effect a gel-like structure within the liquid medium including a variety of particulate filler materials exemplified by wood, flour, cork, carbon black, diatomaceous earth, silica gel and the like high surface area silicas, slate dust, sand and gravel, asbestos fibers, etc. which modify fluid flow characteristics by one or more mechanisms, as, for example, the subtraction of a portion of the liquid(s) and/or liquid constituent(s) by absorption and/or adsorption, the immobilization of the liquid or a phase thereof by adsorption or surface adhesion, or the structural interlocking of the particles to form a skeleton or relatively rigid body. Although adequately effective in many applications, such conventional means nevertheless frequently involve the utilization of comparatively costly materials or the addition of the agent in relatively high and adulterating proportions, or both, among other disadvantages.

It is accordingly a primary object of this invention to provide a new and advantageous rheological use or application for a known mineral material.

It is also a primary object of this invention to provide a low cost mineral having unique and highly effective thickening or inspissating properties.

It is a further object of this invention to provide a new viscosity control agent which is not sensitive to moisture and provides a low cost and more effective means of thickening and/or gelling liquids.

It is a further object of this invention to provide an economical and effectual thickening or inspissating agent for polar liquids.

It is a still further object of this invention to provide an economical gelling agent for nonpolar liquids which is capable of thickening or immobilizing low viscosity nonpolar liquids to the point of gelling or congealing when applied in very minor amounts.

It is also an object of this invention to provide means of treating the mineral viscosity controlling agent of this invention to obtain optimum thickening and/or gelling properties therefrom.

It is also an object of this invention to provide a low cost material for the thickening and/or gelling of calking putties, sealants or fillers such as wood fillers and putties, resin adhesives, flammable liquid fuels, asphaltic plastigels, greases, asphalts or asphalt products and the like materials.

These and other objects and advantages are more apparent from the hereinafter detailed description.

The present invention is founded in the discovery of the useful and advantageous thickening and/or gelling properties of the mineral loughlinite and in the application or utilization and improvement of this unique property of the mineral. In brief, this invention comprises a new use or application of the mineral loughlinite and a novel, useful and economical means of effecting or controlling the rheological properties of liquid materials, and in particular inducing or imparting the thickening and/or gelling of liquids.

The fibrous mineral loughlinite thickening and/or gelling agent of this invention consists of a hydrous sodium-magnesium silicate having the approximate composition $Na_2O.3MgO.6SiO_2.8H_2O$. This material is pearly white fibrous mineral of semi-hard fibrous consistency and is fully described and identified by Fahey, Ross and Axelrod (1960), "Loughlinite, A New Hydrous Sodium Magnesium Silicate," The American Mineralogist, vol. 45, pages 270–281. Fahey et al. assigned a refractive index value of 1.525 to this mineral whereas the loughlinite material utilized in the examples of this application exhibited a refractive index of $1.504 \pm 0.004$. It was found, however, that the refractive index of loughlinite was increased somewhat due to leaching or weathering of the mineral whereby it appears that the instant material may have been fresher than the sample examined by Fahey et al. For instance, the refractive index of a current sample of loughlinite was raised from 1.504 to 1.518 after four weeks of leaching with water. Nevertheless, the total water content 19.8% of the instant mineral compares very well with the Fahey et al figure of 20.5%.

The loughlinite mineral employed herein occurred as a cross veined fiber in small (maximum about 1 cm.) parallel and subparallel veins in a reddish fissile dolomitic shale along with several other well developed minerals of calcium and sodium. It was found that the crude loughlinite bearing ore was amenable to effective processing or refining by means of conventional asbestos milling and fiberizing techniques or processes and apparatus, and in turn could be graded according to the Quebec standard for asbestos fibers. Thus employing conventional means, fibrous loughlinite is easily separated from the associated mother rock, fissile, dolomitic shale, etc. Initial examinations indicated that the conventionally milled fiber contained a considerable amount, up to about 10% of organic material associated therewith but solvent extraction analysis established that the organic content was probably associated with the dolomitic shale rather than the fibrous loughlinite. Although this mineral resembles asbestos in appearance due to its fibrous structure and thereby could be refined or milled in a like manner, loughlinite has a few, if any, other analogous or common properties or characteristics with those of asbestos.

Typical chemical analyses of two distinct and representative samples of loughlinite are as set forth.

TABLE I.—CHEMICAL ANALYSIS OF THE MINERAL LOUGHLINITE

| | Percent | |
|---|---|---|
| | Sample A | Sample B |
| Moisture loss at 105° C | | 11.0 |
| Ignition loss at 800° F | 17.9 | 7.5 |
| Additional loss at 1,000° F | 3.8 | 0.67 |
| Additional loss at 1,800° F | | 3.7 |
| Total ignition loss at 1,800° F | 27.0 | 22.87 |
| $SiO_2$ | 40.5 | 46.3 |
| $Fe_2O_3$ | 1.8 | 4.8 |
| $FeO$ | | 2.0 |
| $TiO_2$ | 0.08 | [0.14 |
| $P_2O_5$ | 0.04 | |
| $Al_2O_3$ | 1.1 | 1.7 |
| $CaO$ | 5.5 | 2.5 |
| $MgO$ | 12.3 | 12.4 |
| $Na_2O$ | 9.6 | 6.8 |
| $K_2O$ | 0.74 | 0.18 |
| | 98.66 | 99.69 |

Further sundry properties of the mineral loughlinite comprise:
Particle shape—truly fibrous-like.
Specific gravity—2.2.[1]
Optics—$\gamma$=1.504 and is parallel to fiber axis.
Bulk density—between approximately 4.1 and 7.9.
Surface area—54–59 m.$^2$/gm.
Water absorption—240%.
Oil absorption—276%.
Moisture content 105° C.—16.4% on very pure hand-picked material.
pH of aqueous slurry—10.7.

[1] Fahey, Ross and Axelrod, supra.

The unique and highly effective thickening and/or gelling properties of the fibrous mineral loughlinite, in particular the capacity to completely gel or solidify nonpolar liquids at relatively low concentrations, and the responsiveness of this mineral to relatively low cost available asbestos milling and/or refining techniques provides an agent or means of economically and effectively regulating or increasing viscosities of liquids to any desired degree including substantial immobilization thereof.

The loughlinite mineral material of this invention must be fibrous in form or structure, its natural state, to effect or impart any appreciable thickening and/or gelling at relatively low concentrations and reducing the natural or initial fibers to a powder-like configuration as by grinding or extensive milling results in a material which at low concentration merely settles out of a liquid phase with little over-all thickening effect and no trace of a gelling effect in nonpolar liquids such as benzene. Fiber dimensions for this application preferably average within the range of 10 to 500 microns in length and 0.25 to 5 microns in diameter and for conventionally micropulverized and air-jet milled loughlinite materials a typical fiber classification is as follows:

TABLE II.—LOUGHLINITE FIBER DIMENSIONS

|  | Micropulverized | Air-Jet Milled |
| --- | --- | --- |
| Approximate Fiber Length: |  |  |
| Maximum noted | 2,000 microns (2 mm.) | 700 microns. |
| Few greater than | 1,000 microns (1 mm.) | 200 microns. |
| Majority | 50–500 microns | 10–100 microns. |
| Average | 250 microns | 50 microns. |
| Approximate Fiber Diameter: Average | 1 micron | ½ micron. |

When added to a highly polar liquid such as water, alcohol, etc., in apt quantities of, for example, about 2 or 3% by weight thereof, the fibrous loughlinite produces thick slurries of substantially greater consistency or thickness than a slurry provided by an equal amount of asbestos or the like fibers of like dimensions. However, when added to nonpolar organic liquids such as carbon tetrachloride, benzene, toluene, xylene, etc., a gel is immediately formed upon dispersion, and the more polar the liquid medium the less gel-like and more slurry-like the mixture becomes. For example, only slurries are formed when fibrous loughlinite is combined with liquids as polar as water, methanol, isopropanol and acetone. The slurries formed with polar liquids are quite light in color while the good gels produced from nonpolar liquids are dark. Materials of intermediate polarity form mixtures of intermediate consistency and color. This characteristic of loughlinite is in marked contrast to asbestos fiber which forms only slurries in nonpolar as well as polar liquid media.

In polar liquids the fiber length of the loughlinite appears to be a more significant factor than the fiber surface area in effecting viscosity increases, due apparently to a more stable fiber matrix or system as it is presumed, based upon experimentations and observations, that the thickening properties of loughlinite in polar media may be the result of mechanical fiber interaction. Although crude loughlinite fiber gelled nonpolar liquids, the efficiency and uniformity of the gelling action thereof is markedly improved when the fibers are micropulverized, and optimum conditions can be achieved with the finer air-jet milled loughlinite fiber whereby the efficiency and uniformity of the gelling effect upon nonpolar liquids increases with increased fiber opening. Without limiting this invention to any theory it appears that the mechanism of this phase of the invention may be due to a combination of the increased surface area amplifying possible chemical and/or physical surface interactions(s) with the liquid coupled with the greater number of individual fibers effecting immobilization of a greater volume of liquid. For example, 3% by weight of micropulverized loughlinite fiber effects a rather stiff gel in nonpolar hydrocarbons such as carbon tetrachloride and nonpolar aromatic hydrocarbons such as benzene, toluene, etc., but as the fiber is opened even further as by air-jet milling a stiff gel of comparable rigidity can be obtained with only about 1½ to 2% by weight of fiber.

As should be apparent from the foregoing, effective and appropriate proportions or concentrations of fibrous loughlinite to produce the desired degree of thickening and/or gelling are dependent upon both the particular liquid medium and/or the fiber dimensions or conditions. For instance, 0.5 to 1 or 2% by weight of fiber may suffice for a particular application but in some cases 8 to 10% by weight of fiber may be required with about 3 to 5% by weight of loughlinite fiber imparting marked viscosity increases in most typical liquids and/or immobilizing gels in many nonpolar organic liquids.

The following examples comprise specific illustrations of the thickening or gelling properties and the capacity of the natural mineral loughlinite in a variety of diverse liquid media, and demonstrate the utility and pronounced effects of this material upon the rheological properties of liquids. It should be understood that the techniques or processes, and conditions and results employed or given are merely exemplary and are not to be construed as limiting the invention to any particular data or conditions recited therein.

Certain of the hereinafter examples illustrating the pronounced thickening and/or gelling properties of fibrous loughlinite also comprise, when obtainable, viscosity data for asbestos fiber as a material or like fibrous form or configuration and similar composition for purposes of comparison, and like data for bentointe clay or Bentone 38 as representative materials of typical commercial thickeners of wide application. To correlate the relative evaluation of loughlinite fiber with analogous materials, the conventionally milled loughlinite having an average length of about ¼ in. was compared with a grade 3T asbestos fiber which is of approximately the same average length, and the micropulverized loughlinite fiber was compared with a grade 6D air cleaned and micropulverized asbestos fiber of approximately like average length. The bentonite clay comprised a standard commercial thickener for inorganic materials and the BENTONE 38, a product of Baroid Division of National Lead Co., consists of an organic derivative of a special magnesium montmorillonite designed for thickening and gelling organic liquids.

The viscosity data of these examples was obtained with a standard Brookfield viscometer with readings taken, when possible, after 2, 4, 10 and 20 spindle revolutions. In most cases the viscosity values dropped with time due to orientation or alignment of the fibrous materials with the spindle or direction of rotation whereby only readings taken under the same conditions should be compared. The samples of the given compositions and concentrations thereof were tested in 400 milliliter quantities contained in 600 milliliter beakers under the conditions specified. The spindles were as given in each example except in the runs on bentonite and BENTONE 38 which, at the concentrations tested, provided suspensions so thin that the No. 1 spindle was utilized in all tests. All viscosity values are given in centipoises.

EXAMPLE I

This example comprises a direct comparison of the effects upon the viscosity of water of the fibrous loughlinite of this invention, both conventionally milled and micropulverized, with comparable sized asbestos fiber and bentonite employing a Brookfield viscometer. The conditions of the determinations and results thereof are given in the following Table III.

ing testing and the micropulverized loughlinite did not settle at any concentrations, whereas the asbestos fibers of comparable dimensions settled out in both instances prior to the completion of the tests.

EXAMPLE II

The viscosity effect or thickening and gelling properties of conventionally milled loughlinite and a comparable dimensioned asbestos fiber, and micropulverized loughlinite also with a comparably sized asbestos, and BENTONE 38, an inorganic thickener for organic liquids, upon methyl- TABLE III.—THICKENING EFFECT OF FIBROUS LOUGHLINITE AND RELATED MATERIALS UPON WATER

| Thickener, percent | | 0 | | 1 | | 2 | | 4 | |
|---|---|---|---|---|---|---|---|---|---|
| Spindle No | | 1 | | 2 | | 2 | | 3 | |
| Thickener | Revolutions | Readings | Viscosity | Readings | Viscosity | Readings | Viscosity | Readings | Viscosity |
| Loughlinite fiber | 2 | 0.4 | 4 | 3.6 | 144 | 11.2 | 448 | 13.1 | 1,310 |
| | 4 | 0.4 | 4 | 3.5 | 140 | 9.9 | 396 | 11.3 | 1,130 |
| | 10 | 0.4 | 4 | (¹) | (¹) | 9.9 | 396 | 9.9 | 990 |
| | 20 | 0.4 | 4 | (¹) | (¹) | 9.2 | 368 | 8.5 | 850 |
| Asbestos fiber | 2 | 0.4 | 4 | (¹) | (¹) | (¹) | (¹) | (¹) | (¹) |
| | 4 | 0.4 | 4 | (¹) | (¹) | (¹) | (¹) | (¹) | (¹) |
| | 10 | 0.4 | 4 | (¹) | (¹) | (¹) | (¹) | (¹) | (¹) |
| | 20 | 0.4 | 4 | (¹) | (¹) | (¹) | (¹) | (¹) | (¹) |
| Micropulverized loughlinite | 2 | 0.4 | 4 | 2.8 | 112 | 17.1 | 684 | 81.5 | 8,150 |
| | 4 | 0.4 | 4 | 2.4 | 96 | 15.2 | 608 | 70.9 | 7,090 |
| | 10 | 0.4 | 4 | 2.4 | 96 | 13.8 | 552 | 61.0 | 6,100 |
| | 20 | 0.4 | 4 | 2.3 | 92 | 12.9 | 516 | 56.7 | 5,670 |
| Micropulverized asbestos | 2 | 0.4 | 4 | 1.4 | 56 | 3.3 | 132 | 5.4 | 540 |
| | 4 | 0.4 | 4 | (¹) | (¹) | (¹) | (¹) | 5.3 | 530 |
| | 10 | 0.4 | 4 | (¹) | (¹) | (¹) | (¹) | 5.4 | 540 |
| | 20 | 0.4 | 4 | (¹) | (¹) | (¹) | (¹) | (¹) | (¹) |
| Bentonite | 2 | 0.4 | 4 | 0.5 | 5 | 0.6 | 6 | 1.6 | 16 |
| | 4 | 0.4 | 4 | 0.5 | 5 | 0.5 | 5 | 1.8 | 18 |
| | 10 | 0.4 | 4 | 0.5 | 5 | 0.5 | 5 | 2.2 | 22 |
| | 20 | 0.4 | 4 | 0.4 | 4 | 0.5 | 5 | 3.4 | 34 |

¹ Settles out.

Only at the 1% concentration did the conventionally milled loughlinite fiber exhibit any tendency to settle during ethyl ketone were determined according to the conditions and provided the results specified in Table IV.

TABLE IV.—THICKENING EFFECT OF FIBROUS LOUGHLINITE AND RELATED MATERIALS UPON METHYLETHYL KETONE

| Thickener, percent | | 0 | | 1 | | 2 | | 4 | |
|---|---|---|---|---|---|---|---|---|---|
| Spindle No | | 1 | | 2 | | 2 | | 3 | |
| Thickener | Revolutions | Readings | Viscosity | Readings | Viscosity | Readings | Viscosity | Readings | Viscosity |
| Loughlinite | 2 | 0.2 | 2 | (¹) | (¹) | 20.7 | 828 | 9.8 | 980 |
| | 4 | 0.2 | 2 | (¹) | (¹) | 19.4 | 776 | 8.6 | 860 |
| | 10 | 0.2 | 2 | (¹) | (¹) | 17.4 | 696 | 7.7 | 770 |
| | 20 | 0.2 | 2 | (¹) | (¹) | 17.2 | 688 | 8.5 | 850 |
| Asbestos fiber | 2 | 0.2 | 2 | (¹) | (¹) | (¹) | (¹) | (¹) | (¹) |
| | 4 | 0.2 | 2 | (¹) | (¹) | (¹) | (¹) | (¹) | (¹) |
| | 10 | 0.2 | 2 | (¹) | (¹) | (¹) | (¹) | (¹) | (¹) |
| | 20 | 0.2 | 2 | (¹) | (¹) | (¹) | (¹) | (¹) | (¹) |
| Micropulverized loughlinite | 2 | 0.2 | 2 | (¹) | (¹) | 9.6 | 384 | (²) | (²) |
| | 4 | 0.2 | 2 | (¹) | (¹) | 9.3 | 372 | (²) | (²) |
| | 10 | 0.2 | 2 | (¹) | (¹) | (¹) | (¹) | (²) | (²) |
| | 20 | 0.2 | 2 | (¹) | (¹) | (¹) | (¹) | (²) | (²) |
| Micropulverized asbestos | 2 | 0.2 | 2 | (¹) | (¹) | (¹) | (¹) | 4.0 | 400 |
| | 4 | 0.2 | 2 | (¹) | (¹) | (¹) | (¹) | (¹) | (¹) |
| | 10 | 0.2 | 2 | (¹) | (¹) | (¹) | (¹) | (¹) | (¹) |
| | 20 | 0.2 | 2 | (¹) | (¹) | (¹) | (¹) | (¹) | (¹) |
| BENTONE 38 | 2 | 0.2 | 2 | 0.7 | 7 | 0.8 | 8 | 1.1 | 11 |
| | 4 | 0.2 | 2 | (¹) | (¹) | (¹) | (¹) | (¹) | (¹) |
| | 10 | 0.2 | 2 | (¹) | (¹) | (¹) | (¹) | (¹) | (¹) |
| | 20 | 0.2 | 2 | (¹) | (¹) | (¹) | (¹) | (¹) | (¹) |

¹ Settles out.   ² Thick slurry-like gel formed; good readings not possible.

In these runs the asbestos fiber of both size classifications settled out before any significant readings could be obtained whereas the fibrous loughlinite in each case markedly increased the viscosity at the higher concentrations, and the micropulverized material produced a thick slurry-like gel too viscous to obtain a reading at 4% concentration.

EXAMPLE III

In this example the effect of micropulverized loughlinite and a comparable size asbestos fiber and BENTONE 38 upon the viscosity of benzene was determined under the conditions and with the effects comprising the data of Table V.

As is apparent, the asbestos settled out or exhibited a tendency to settle out under all concentrations examined as did the BENTONE 38 whereas the loughlinite produced a marked viscosity increase at 2% concentration and at 4% produced a viscid gel in which there was no flow and could not be utilized to obtain a reading.

EXAMPLE IV

Glass fibers have been disclosed in the prior art as having viscosity imparted properties whereby the relative thickening and/or gelling effects of glass fiber and fibrous loughlinite were compared in a No. 40 motor oil with a Brookfield viscometer under the same conditions as the foregoing examples. The glass fibers employed had a length approximately 1/32 to 3/8 in. The results were as follows.

TABLE V.—THICKENING EFFECT OF FIBROUS LOUGHLINITE AND RELATED MATERIALS UPON BENZENE

| Thickener, percent | | 0 | | 1 | | 2 | | 4 | |
|---|---|---|---|---|---|---|---|---|---|
| Spindle No. | | 1 | | 2 | | 2 | | 3 | |
| Thickener | Revolutions | Readings | Viscosity | Readings | Viscosity | Readings | Viscosity | Readings | Viscosity |
| Micropulverized loughlinite | 2 | 0.2 | 2 | 3.9 | 156 | 11.5 | 460 | (²) | (²) |
|  | 4 | 0.2 | 2 | (¹) | (¹) | 11.2 | 448 | (²) | (²) |
|  | 10 | 0.2 | 2 | (¹) | (¹) | 10.2 | 408 | (²) | (²) |
|  | 20 | 0.2 | 2 | (¹) | (¹) | 10.0 | 400 | (²) | (²) |
| Micropulverized asbestos | 2 | 0.2 | 2 | (¹) | (¹) | 7.2 | 288 | 6.3 | 630 |
|  | 4 | 0.2 | 2 | (¹) | (¹) | (¹) | (¹) | 5.7 | 570 |
|  | 10 | 0.2 | 2 | (¹) | (¹) | (¹) | (¹) | 4.6 | 460 |
|  | 20 | 0.2 | 2 | (¹) | (¹) | (¹) | (¹) | 4.3 | 430 |
|  |  |  |  |  |  |  |  | (Tends to settle out.) | |
| BENTONE 38 | 2 | 0.2 | 2 | 0.5 | 5 | 0.7 | 7 | 0.8 | 8 |
|  | 4 | 0.2 | 2 | (¹) | (¹) | (¹) | (¹) | (¹) | (¹) |
|  | 10 | 0.2 | 2 | (¹) | (¹) | (¹) | (¹) | (¹) | (¹) |
|  | 20 | 0.2 | 2 | (¹) | (¹) | (¹) | (¹) | (¹) | (¹) |

¹ Settles out.
² Good gel formed—meaningful readings not possible.

TABLE VI.—THICKENING EFFECT OF FIBROUS LOUGHLINITE AND RELATED MATERIALS IN NO. 40 MOTOR OIL

| Fiber, percent | | 0 | | 1 | | 2 | | 4 | |
|---|---|---|---|---|---|---|---|---|---|
| Spindle No. | | 2 | | 4 | | 5 | | 7 | |
| R.p.m. | | 10 | | 10 | | 10 | | 10 | |
|  | Revolutions | Readings | Viscosity | Readings | Viscosity | Readings | Viscosity | Readings | Viscosity |
| No. 40 Motor Oil | 2 | 9.3 | 372 | 23.5 | 4,700 | 23.6 | 9,440 | 16.1 | 64,400 |
|  | 4 | 9.3 | 372 | 24.6 | 4,920 | 25.3 | 10,120 | 14.7 | 58,800 |
|  | 10 | 9.3 | 372 | 22.3 | 4,460 | 19.4 | 7,760 | 13.8 | 55,200 |
|  | 20 | 9.3 | 372 | 21.8 | 4,360 | 19.8 | 7,920 | 13.6 | 54,400 |
| Micropulverized Loughlinite Thickener | | | | | | | | | |
| No. 40 Motor Oil | 2 | 9.2 | 368 | 7.6 | 1,520 | 12.8 | 5,120 | 6.4 | 25,600 |
|  | 4 | 9.2 | 368 | 7.5 | 1,500 | 12.3 | 4,920 | 5.2 | 20,800 |
|  | 10 | 9.2 | 368 | 8.1 | 1,620 | 11.4 | 4,560 | 4.2 | 16,800 |
|  | 20 | 9.2 | 368 | 7.8 | 1,560 | 10.8 | 4,320 | 4.0 | 16,000 |
| Glass Fiber Thickener | | | | | | | | | |
| No. 40 Motor Oil | 2 | 9.1 | 364 | 7.1 | 1,420 | 8.0 | 3,200 | 1.6 | 6,400 |
|  | 4 | 9.2 | 368 | 8.5 | 1,700 | 7.4 | 2,960 | 0.9 | 3,600 |
|  | 10 | 9.3 | 372 | 8.5 | 1,700 | 7.1 | 2,840 | 0.6 | 2,400 |
|  | 20 | 9.1 | 364 | 7.8 | 1,560 | 6.2 | 2,480 | 0.6 | 2,400 |

EXAMPLE V

To ascertain the extent of the thickening and/or gelling effects of fibrous mineral loughlinite this material was applied in minor amounts to a variety of common organic liquids of varied composition and/or organic categories. The water and organic liquids and/or liquid compositions utilized, and the concentrations of the fibrous material together with the observed results of admixing these materials are tabulated as follows:

TABLE VII.—THICKENING AND/OR GELLING EFFECT OF FIBROUS LOUGHLINITE UPON VARIOUS LIQUIDS

| Liquid | Fibrous Loughlinite | Effect |
| --- | --- | --- |
| Water | 4% micropulverized | Thick slurry. |
| Do | 4% fiber $\frac{1}{32}$ to $\frac{3}{8}$ in. air jet milled. | Thickened. |
| Benzene | 2% air jet milled | } Solid gel. |
| Toluene | 3% micropulverized | |
| Xylene | 3% air jet milled | } Stiff gel. |
| Carbon Tetrachloride | 4% micropulverized | |
| Acetone | } 4% micropulverized | Thick slurry. |
| Methylethyl Ketone | | |
| Methyl Alcohol | | |
| Isopropyl Alcohol | | |
| Heptane | 3% micropulverized | Gel-like. |
| Kerosene | do | Solid gel. |
| SAE No. 40 Oil | 4% fiber $\frac{1}{32}$ to $\frac{3}{8}$ in. air jet milled. | Very viscous, slow flow. |
| SAE No. 40 Oil | 4% micropulverized | Viscous fluid. |
| Commander H Oil* | 6% air jet milled | Thick grease with no flow. |
| Do | 6% micropulverized | Do. |
| JP-1 (jet fuel) | 2% air jet milled | Solid gel. |
| Do | 3% micropulverized | Do. |
| JP-4 (jet fuel) | 2% air jet milled | Gel-like. |

*A paraffine oil comparable in viscosity to S.A.E. No. 40 motor oil.

EXAMPLE VI

A specific application of the thickening effect of fibrous mineral loughlinite comprises its use in calking putties and the like sealing compounds. Accordingly, the thickening and/or gelling properties of this mineral were compared with a standard commercial multipurpose thixotropic agent for non-aqueous media, Thixcin, a product of Baker Castor Oil Co. consisting of a finely divided, solidified vegetable-oil derivative, in the vehicle or liquid phase, without the filler solids, of a typical calking putty formulation comprising 49.3 grams of soybean oil, 4.8 grams of fatty vegetable acid [1], 21.9 grams of low molecular weight polybutene, and 24.0 grams of mineral spirits. In this medium, 1% by weight of air-jet milled fibrous loughlinite produced a degree of thickening equivalent to 5% by weight of the Thixcin, a thick but pourable liquid, and at 3% by weight concentration the air-jet milled fibrous loughlinite effected a gel which barely flowed and at 5% concentration the gel would not flow.

EXAMPLE VII

Fibrous mineral loughlinite was employed as a thickening and/or gelling agent in a typical asphaltic plastigel sealing compound of the composition:

| | Grams |
| --- | --- |
| Commander H oil | 310 |
| Milled loughlinite | 10 |
| Pulverized gilsonite | 240 |
| No. 50 Blue black slate dust | 240 |

The resulting thick but handleable admixture fused upon heating to 300° F. to an immobile mass.

It will be understood that the foregoing details are given for purposes of illustration and not restriction, and that variations within the spirit of this invention are to be included within the scope of the appended claims.

I claim:

1. A composition comprising a liquid base thickened with fibrous loughlinite in an effective amount of at least about 0.5% by weight of said fibrous loughlinite based upon the weight of said liquid base.

2. A composition comprising a liquid base thickened with fibrous loughlinite in amount of approximately 0.5 to approximately 10% by weight of said fibrous loughlinite based upon the weight of said liquid base.

3. A composition comprising an organic liquid base thickened with fibrous loughlinite in an effective amount of at least about 0.5% up to about 10% of said fibrous loughlinite based upon the weight of said organic liquid base.

4. A composition comprising a polar liquid base thickened with fibrous loughlinite in an effective amount of at least about 0.5% up to about 10% of said fibrous loughlinite based upon the weight of said polar liquid base.

5. A composition comprising a non-polar liquid base thickened with fibrous loughlinite in an effective amount of at least about 0.5% up to about 10% of said fibrous loughlinite based upon the weight of said non-polar liquid base.

6. A composition comprising a liquid base thickened with fibrous mineral loughlinite in an effective amount of at least approximately 0.5% up to approximately 10% by weight of said fibrous mineral loughlinite based upon the weight of said liquid base, said fibrous mineral loughlinite having an average fiber particle size within the range of about 10 to about 500 microns in length and about 0.25 to about 5 microns in diameter.

References Cited

UNITED STATES PATENTS

| | | | |
| --- | --- | --- | --- |
| 2,784,110 | 3/1957 | Tatlock | 252—28 |
| 2,892,776 | 6/1959 | Lyons et al. | 252—28 |
| 2,900,338 | 8/1959 | Postelnek | 252—28 |
| 2,915,475 | 12/1959 | Bugosh | 252—28 |
| 3,012,856 | 12/1961 | Berry | 252—25 |
| 3,174,930 | 3/1965 | Damerell | 252—25 |
| 3,081,262 | 3/1963 | Goodrich | 252—25 |

OTHER REFERENCES

"Manufacture and Application of Lubricating Grease," by Boner, Reinhold Pub. Corp., New York, 1954, page 701.

DANIEL E. WYMAN, *Primary Examiner.*

IRVING VAUGHN, *Assistant Examiner.*

U.S. Cl. X.R.

44—7; 106—33, 286; 208—39

---

[1] The fatty vegetable acid had a saponification value of 198 to 207, an iodine number of 115 to 124, and an acid number of 195 to 205.